(12) United States Patent
Meyen

(10) Patent No.: US 11,085,237 B2
(45) Date of Patent: Aug. 10, 2021

(54) MASS TUNED LADDER RUNG AND LADDER FORMED THEREWITH

(71) Applicant: Caterpillar Inc., Deerfield, IL (US)

(72) Inventor: Thomas A. Meyen, Clinton, IL (US)

(73) Assignee: Caterpillar Inc., Peoria, IL (US)

( * ) Notice: Subject to any disclaimer, the term of this patent is extended or adjusted under 35 U.S.C. 154(b) by 297 days.

(21) Appl. No.: 16/229,960

(22) Filed: Dec. 21, 2018

(65) Prior Publication Data
US 2020/0199937 A1 Jun. 25, 2020

(51) Int. Cl.
*E06C 7/08* (2006.01)
*B60R 3/02* (2006.01)
*E06C 5/04* (2006.01)

(52) U.S. Cl.
CPC .............. *E06C 7/084* (2013.01); *B60R 3/02* (2013.01); *E06C 7/08* (2013.01); *E06C 5/04* (2013.01)

(58) Field of Classification Search
CPC . E06C 7/08; E06C 7/081; E06C 7/082; E06C 7/084; E06C 7/085; B60R 3/00; B60R 3/04
See application file for complete search history.

(56) References Cited

U.S. PATENT DOCUMENTS

| | | | | |
|---|---|---|---|---|
| 1,134,032 A * | 3/1915 | Clarke | ...................... | B60R 3/00 182/93 |
| 2,226,489 A * | 12/1940 | Doherty | ................. | B61D 23/00 182/90 |
| 2,390,000 A * | 11/1945 | Sampson | ................... | E06C 7/08 182/178.4 |
| 3,741,341 A * | 6/1973 | Bustin | ........................ | E06C 7/08 182/228.2 |
| 4,182,431 A | 1/1980 | Wing et al. | | |
| 4,333,547 A * | 6/1982 | Johansson | ................. | B60R 3/00 182/196 |
| 5,117,943 A | 6/1992 | Schmitt et al. | | |
| 5,931,257 A * | 8/1999 | Harden | ...................... | E04G 5/10 182/90 |
| 6,000,496 A * | 12/1999 | Rinaldi | ..................... | B60R 3/02 182/127 |
| 7,025,174 B1 | 4/2006 | Hawley | | |
| 9,688,204 B2 * | 6/2017 | Tsutsumi | .............. | E02F 9/0858 |
| 10,246,940 B1 * | 4/2019 | Haro | .......................... | E06C 7/02 |
| 10,538,205 B2 * | 1/2020 | Iotti | ...................... | E02F 9/0833 |
| 10,604,078 B2 * | 3/2020 | Hedley | ...................... | E06C 1/52 |
| 2014/0319794 A1 * | 10/2014 | Mullas | ...................... | B60R 3/02 280/166 |
| 2016/0339843 A1 * | 11/2016 | Rinaldi | ..................... | B60R 3/02 |

FOREIGN PATENT DOCUMENTS

| | | | | |
|---|---|---|---|---|
| CN | 201517364 U | 6/2010 | | |
| CN | 207583293 U | 7/2018 | | |
| DE | 202010010339 U1 | 10/2010 | | |
| GB | 2540252 A | 1/2017 | | |
| WO | WO-9724239 A1 * | 7/1997 | ............... | B60R 3/04 |
| WO | WO-2011027765 A1 * | 3/2011 | ............ | E02F 9/0883 |

* cited by examiner

*Primary Examiner* — Colleen M Chavchavadze
(74) *Attorney, Agent, or Firm* — von Briesen & Roper, s.c.

(57) ABSTRACT

A rung which can be installed in a ladder is disclosed which comprises a first plate having first and second ends, each of the first and second ends having a relief tab and an opening, and a second plate, the second plate being identical to the first plate, the first and second plates being nestable such that the relief tabs of the first plate insert through the openings of the second plate to form the rungs.

19 Claims, 8 Drawing Sheets

MASS TUNED LADDER RUNG AND LADDER FORMED THEREWITH

TECHNICAL FIELD

The present disclosure generally relates to ladders, and more particularly relates to ladders used for access to trucks and other work machines.

BACKGROUND

Many work machines require the use of a ladder to gain access to the operator cabin, cargo bed, or other areas of the machines. For example, with an off-highway truck (OHT), the operator cabin may be several feet above ground, and ladders or stairs may be fixed to the side of the OHT to allow access. The same may be true with mining trucks and other work machines, including but not limited to large excavators, graders, bulldozers, and the like.

To gain access to the fixed exterior ladder or stairs of such OHTs or other machines, a break-away ladder is typically provided. The break-away ladder may only be a rung or two and be provided at a height enabling a human operator to step directly thereon from the ground. However, as such steps have relatively little ground clearance, they are typically designed so as to move, fold or break away from the truck if it were to engage the ground, thereby avoiding significant damage.

In addition, such break-away ladders are often movable from a stowed position to an operational position. However, current ladders often do not reliably lock into position and can thus swing back and forth. Moreover, current break away ladders often include multiple welds lending themselves to fatigue and failure over time, and do not allow for adequate debris fall-through. In other words, given the work environment of such OHTs, it is desirable for dirt and other worksite debris not to build up on the steps of the OHT ladder. In fact, current ISO standards have requirements in this regard.

One example of a prior art ladder is disclosed in U.S. Pat. No. 7,025,174. The '174 patent discloses a truck ladder deployable from a folded position under a trailer bed of the truck to an outward operational position. However, such a ladder suffers from many of the drawbacks mentioned above and thus improvement is desired.

SUMMARY

In accordance with an exemplary embodiment of the present disclosure, a rung which can be installed in a ladder is disclosed which comprises a first plate having first and second ends, each of the first and second ends having a relief tab and an opening, and a second plate, the second plate being identical to the first plate, the first and second plates being nestable such that the relief tab of the first end of the first plate is inserted through the opening of the first end of the second plate and the relief tab of the second end of the second plate is inserted through the opening of the second end of the first plate to form the rungs.

In accordance with another aspect of the disclosure, a ladder for use on a work machine is disclosed wherein the ladder comprises first and second rails adapted to movably attach to the work machine; and a plurality of rungs extending between the first and second rails, each rung including first and second plates, each plate including first and second ends, each end having a relief tab and an opening, the first and second plates being nestable such that the relief tabs of the first ends of the first plates are inserted through the openings of the first ends of the second plates and the relief tabs of the second ends of the second plates are inserted through the openings of the second ends of the first plates to form the plurality of rungs.

In accordance with yet another aspect of the disclosure, a method of manufacturing a break away ladder for a work machine is disclosed wherein the method comprises providing a first plate having first and second ends and first and second sides, providing a second plate having first and second ends and first and second sides, machining a c-shaped cut in each of the first and second ends, bending each of the first and second ends such that each of the first and second ends includes a relief tab and an opening, and nesting the first plate into the second plate such that the relief tab of the first end of the first plate is inserted through the opening of the first end of the second plate and the relief tab of the second end of the second plate is inserted through the opening of the second end of the first plate to form a rung.

These and other aspects and features of the present disclosure will be more readily understood upon reading the following detailed description when taken in conjunction with the accompanying drawings.

While the following detailed description will made with reference to certain illustrative embodiments, it is to be understood that such embodiments are only exemplary and that other embodiments exist are included within the scope of the equivalents of the present application and appended claims.

DETAILED DESCRIPTION

Figure 1:
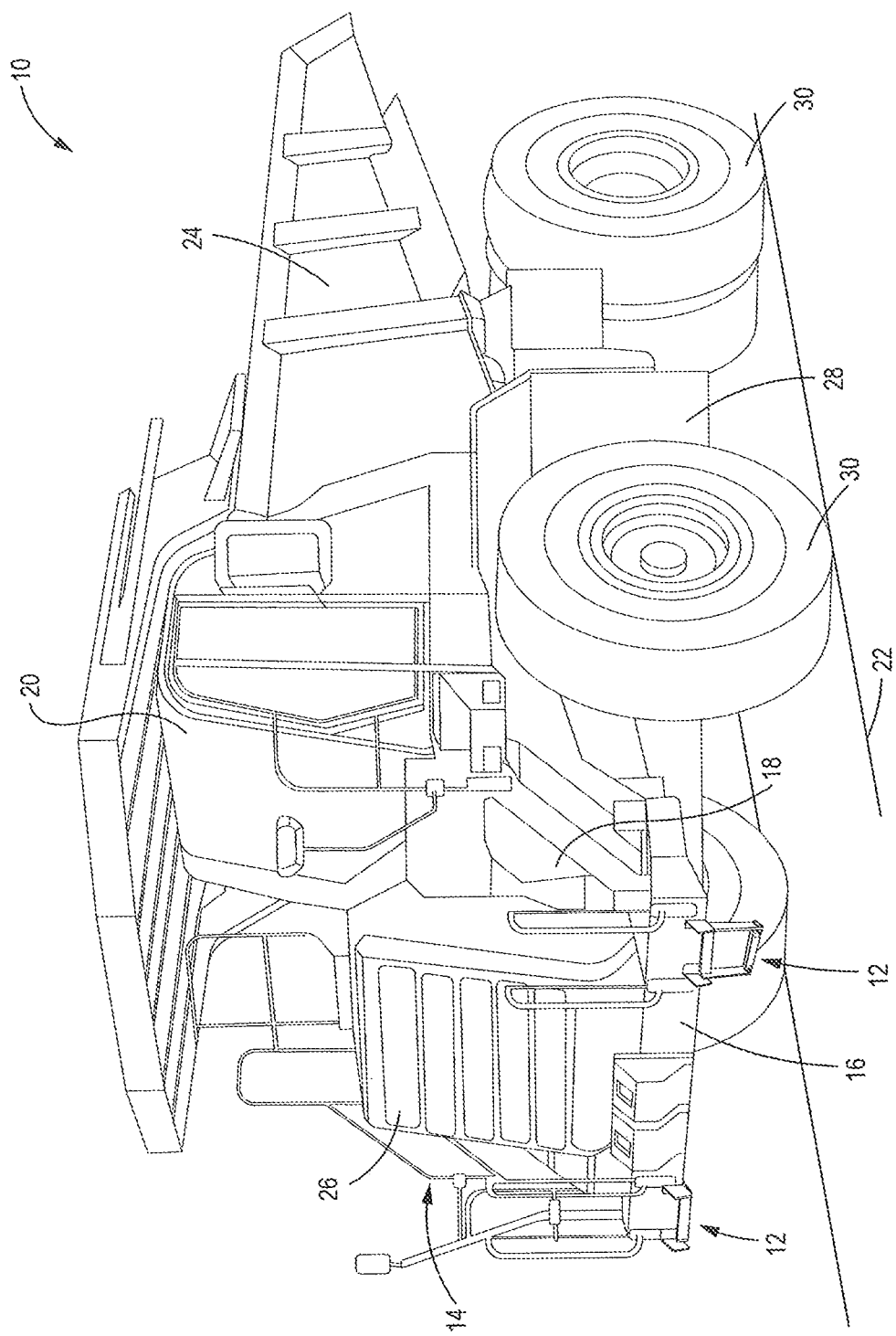
FIG. 1 is a perspective view of a truck constructed in accordance with the present disclosure.

Referring now to the drawings, and with specific reference to FIG. 1, a work machine constructed in accordance with the teachings of this disclosure is generally referred to by reference numeral 10. While the work machine 10 is depicted as an off-highway truck (OHT), it is to be understood that the present disclosure can also be employed with other work machines, including but not limited to, mining trucks, large excavators, graders, bulldozers and the like. In addition, such ladders could be employed not only in such construction or earth moving equipment, but agricultural, commercial, military, marine and aerospace applications as well.

As shown in FIG. 1 of the drawings, two ladders 12 constructed in accordance with the teachings of the present disclosure can be seen attached to a front end 14 of the truck 10. More specifically, ladders 12 are attached to a front bumper 16 to allow a user to climb onto the machine 10 and gain access to fixed stairs 18 leading to the operator cabin 20. As can be appreciated from FIG. 1, the operator cabin 20 is several feet above ground 22 and thus such ladders 12 and stairs 18 are necessary for access not only thereto, but to cargo bed 24, engine 26, chassis 28, wheels 30 and other areas of the work machine 10. Moreover, in other applications, the operator cabin or other areas needing access may be a different heights than those shown.

While two ladders 12 are shown, it is to be understood that a greater or lesser number of ladders can be provided. However, regardless of the number of ladders employed, each is provided in "break-away" fashion, meaning they are movable between a stowed position to a deployed position. For example, as the ladders 12 have relatively little ground clearance, each ladder 12 may be hingedly attached to the bumper 16 such that upon impact with the ground 22, in either a forward or rearward direction, the ladder 12 can fold upwardly and avoid more significant damage. In addition, as will described in further detail herein, the ladder 12 of the present disclosure is "mass-tuned" so as to facilitate keeping the ladder 12 in one of the stowed and deployed positions until movement is desired and initiated by the operator.

In the paragraphs that follow, the construction of the ladders 12 will be described. In so doing, a ladder which includes no welds, which cannot be mis-assembled, which provides enhanced debris fall-through, which meets ISO standards (see, for example ISO Standard 2867), and which has sufficient mass to lock the ladder in position is provided.

Figure 2:
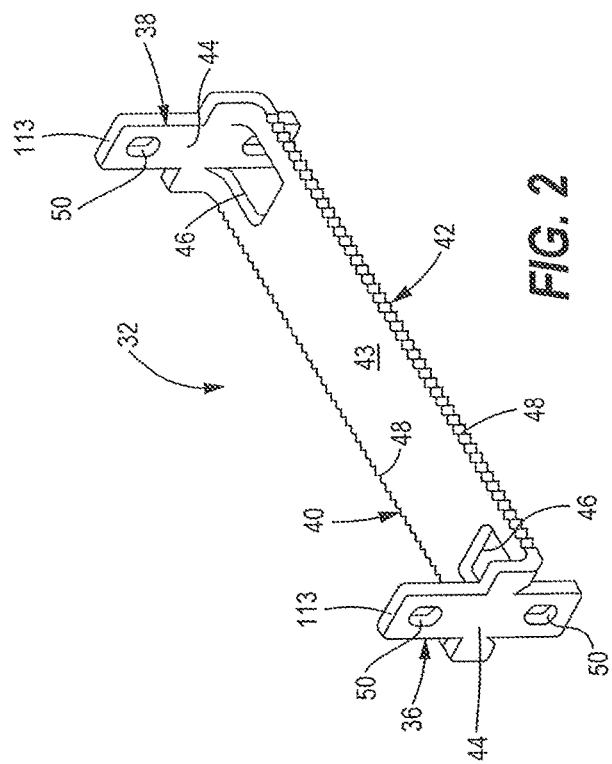
FIG. 2 is a perspective view of one plate used to construct a rung half according to the present disclosure.
Figure 4:
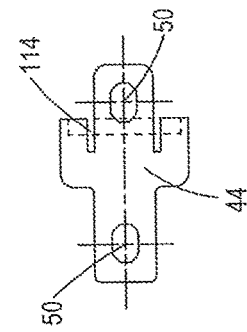
FIG. 4 is an end view of the rung half of a FIG. 2.
Figure 3:
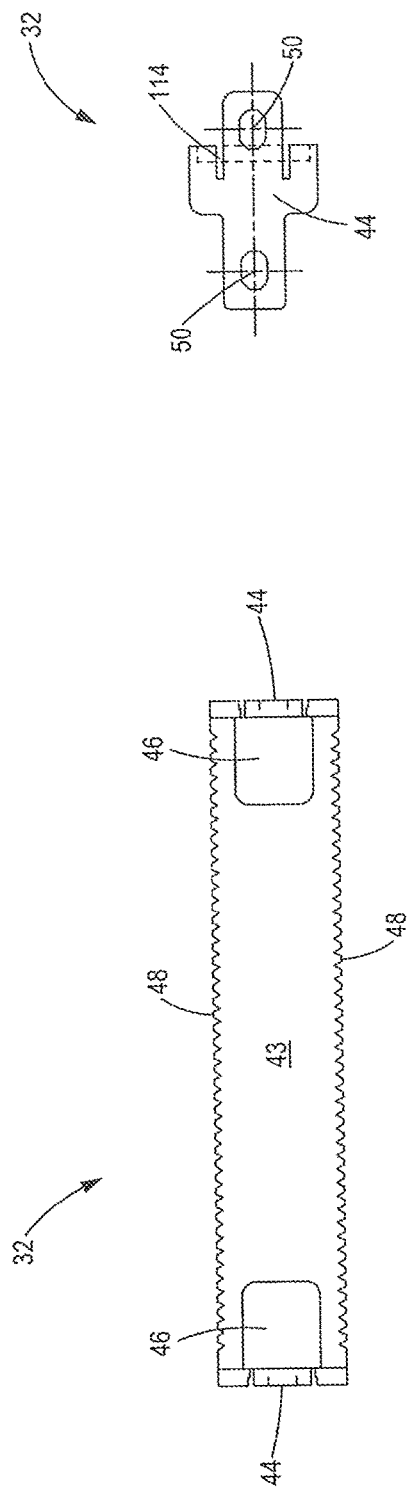
FIG. 3 is a plan view of the rung half of FIG. 2.

Referring to FIGS. 2-4, a plate 32 which can be used to form a rung 34 (FIG. 5) is shown in detail. As depicted therein, the plate 32 is of unitary construction. In other words, a single piece of material, typically steel, is used to construct each plate 32. For example, 2× 544-4156 may be used, preferably at 8mm thick, to provide sufficient mass to lock the ladder 12 in position, but other materials, if sufficiently robust, may also be used. Each plate 32 includes a first end 36 and a second opposite and 38, as well as first and second sides 40, 42, and a plate body 43.

With specific reference to FIG. 2, each plate 32 further includes a relief tab 44 and an opening 46 at first end 36, and a relief tab 44 and opening 46 at second and 38. Each relief tab 44 is bent relative to the plate body 43 so as to be normal thereto as shown best in FIG. 3. Moreover, each of the first and second sides 40, 42, is serrated with a plurality of teeth 48, and each relief tab 44 includes a plurality of bolt holes 50 therethrough. Each relief tab 44 is shown to extend above and below the plane of plate 43, the importance of which will be described in further detail below.

The resulting structure depicted in FIGS. 2-4 forms half of a rung 34. Stated another way, and referring now to FIG. 5, it will be appreciated that each rung 34 is formed by a pair of plates 32 joined together. More specifically, two identical plates 32 are shaped so as to nest together as shown. Given their symmetries, in doing so the relief tab 44 of the first end 36 of the first plate 32 is inserted through the opening 46 of the first end 36 of the second plate 32 and the relief tab 44 of the second end 38 of the second plate 32 is inserted through the opening 46 of the second end 36 of the first plate 32 such that the relief tabs 44 abut in parallel fashion. By forming rungs 34 in such a manner, mis-assembly is avoided in that the rungs 34 can only be assembled in one way.

Such construction also affords benefits with respect to debris fall through. More specifically, the plate bodies 43 of each plate 32 are spaced apart from each other a distance 52 providing ample room for debris, e.g., mud from operator shoes or impact with the ground, etc., to fall therethrough. This so-called debris fall-through area 54 is actually regulated by ISO standards to be 40 mm or less in width for safety purposes, and the current design so complies.

Figure 5:
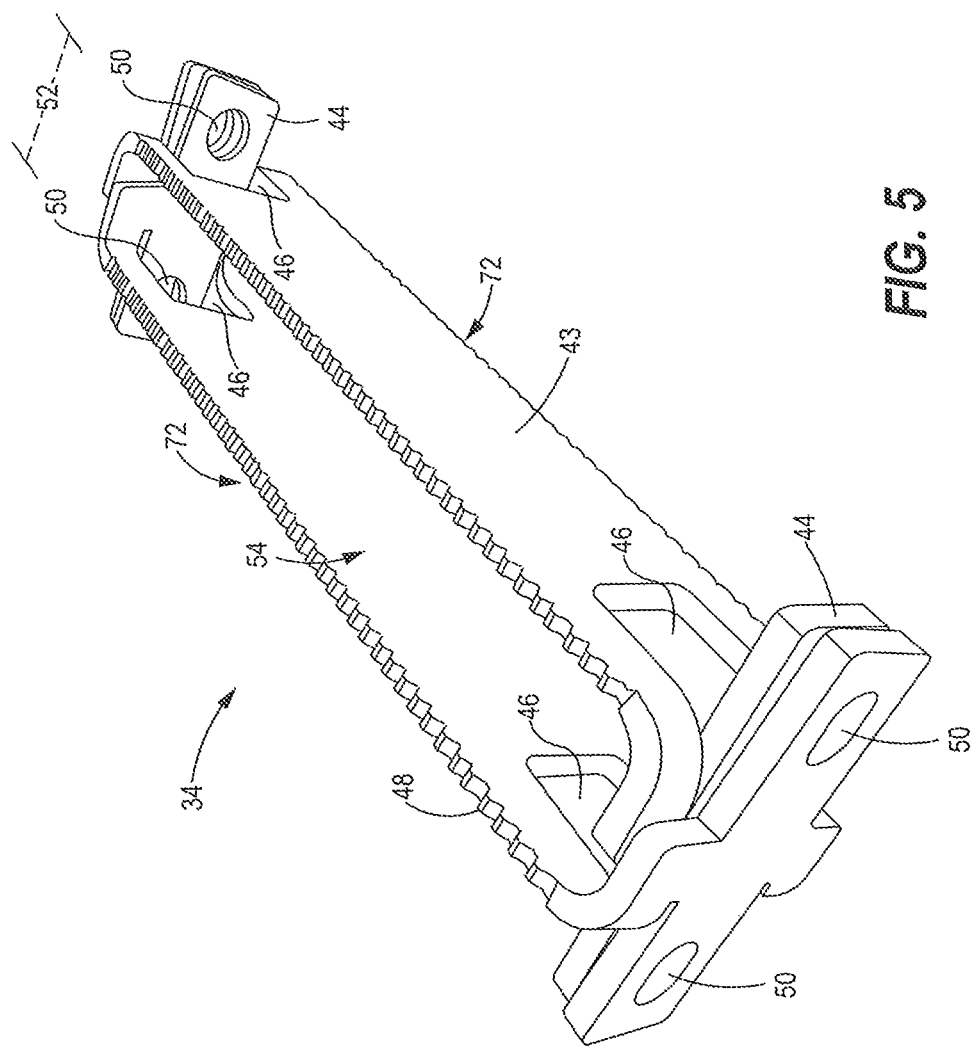
FIG. 5 is a perspective view of an assembled ladder rung according to the present disclosure.
Figure 6:
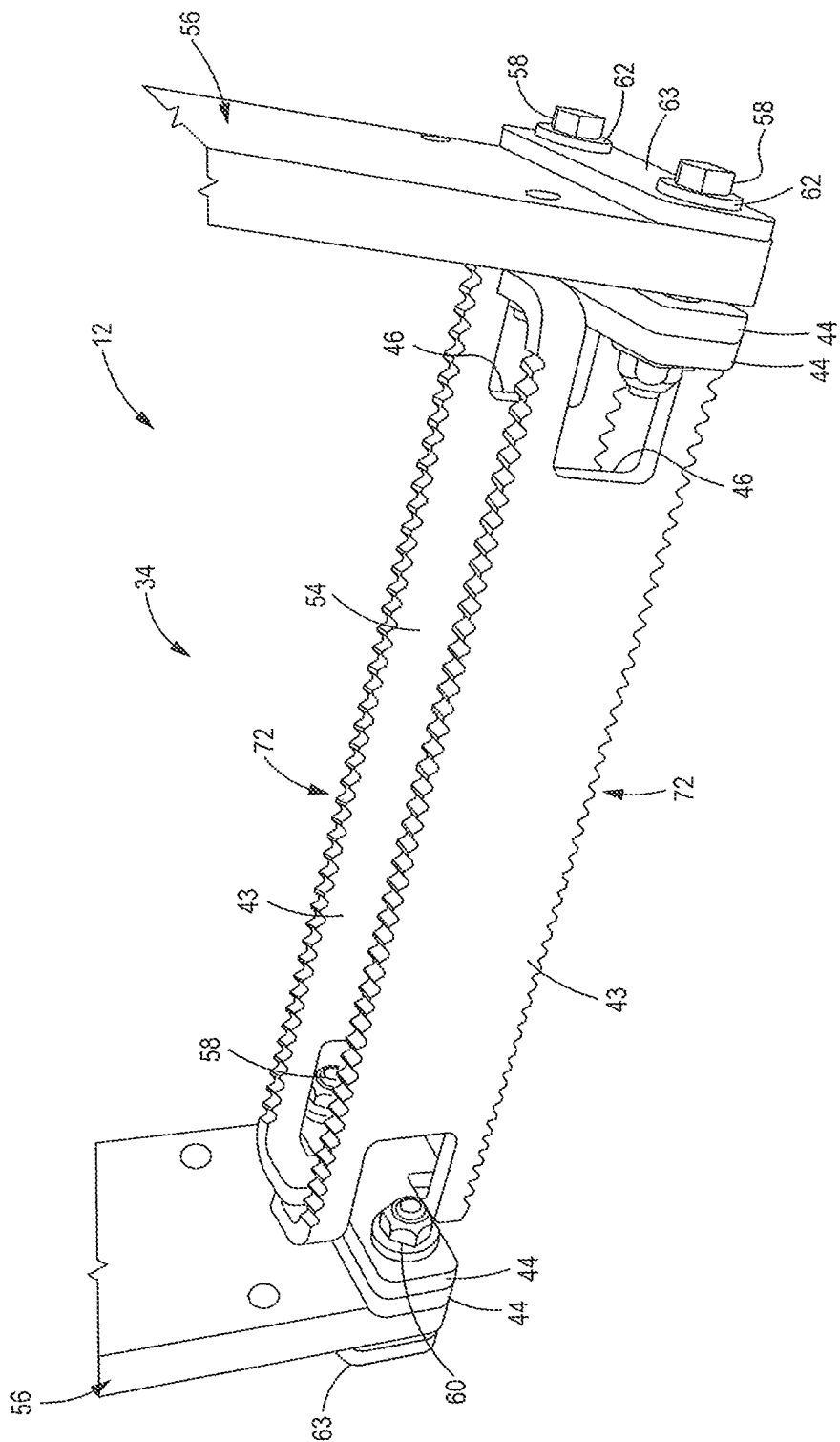
FIG. 6 is an enlarged perspective view of the assembled rung of FIG. 5 and attached to rails to form a ladder.
Figure 7:
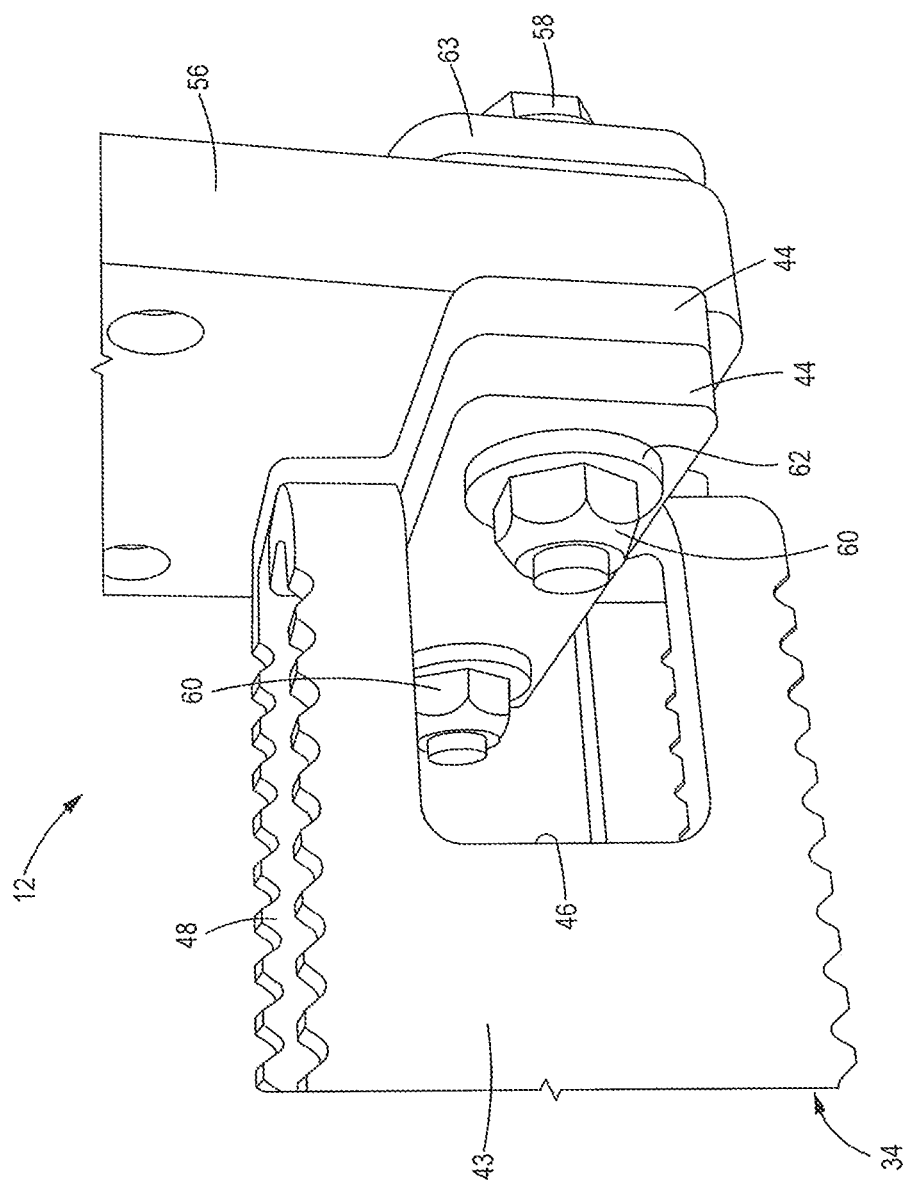
FIG. 7 is a segmented perspective view of one end of FIG. 6.

Turning now to FIG. 6, the assembled rung 34 of FIG. 5 is shown attached to rails 56 to form the ladder 12. More specifically, each rung 34 is positioned perpendicular to rails 56 and attached thereto by extending bolts 58 through bolt holes 50 and secured with nuts 60. Of course, nuts and bolts are but one example of a fastener which could be used to attach the rungs 34 to the rails 56. Washers 62 and plates 63 may also be used as depicted in FIG. 7 to secure the rungs 34 to the rails 56.

Figure 8:
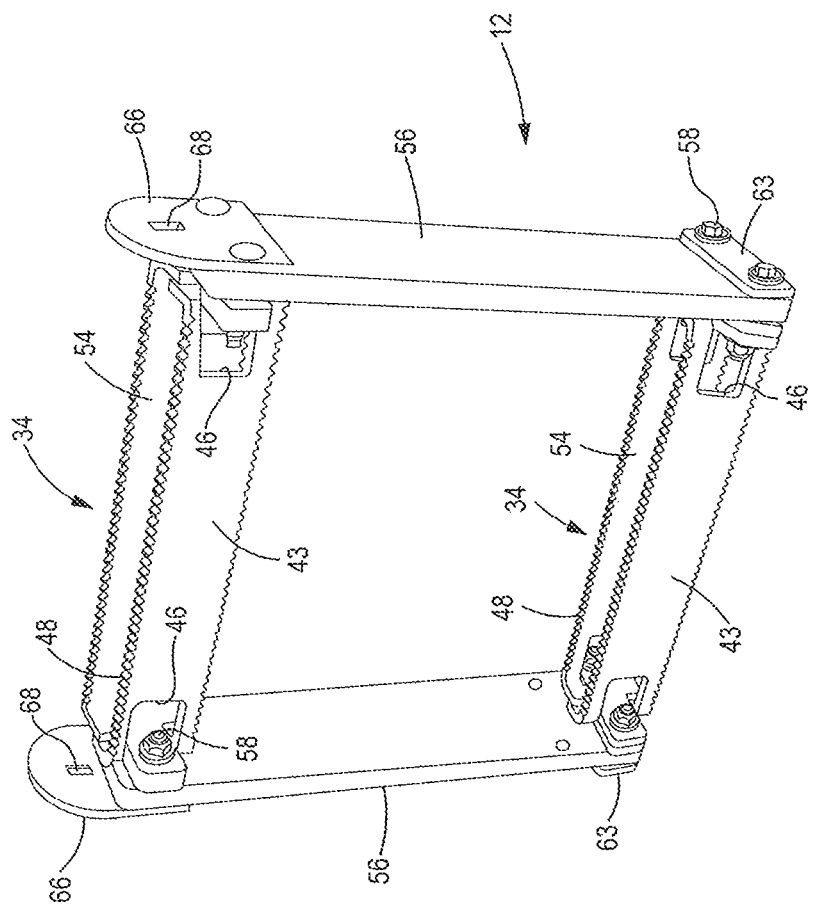
FIG. 8 is a perspective view of an assembled ladder.

As mentioned above, given the ground clearance of the work machine 10, only a rung or two may be necessary to provide sufficient length to enable an operator to step thereon from the ground 22. The resulting assembled ladder 12 is depicted in FIG. 8. Two rungs 34 are depicted therein, but of course, depending on desired criteria, more or less rungs 34 can be employed.

Still referring to FIG. 8, at a top 64 of the ladder 12, support brackets or hinges 66 may be provided. Such support brackets 66 allow the ladder 12 to be attached to the bumper 16 of the work machine 10 in swingable fashion. More specifically, each bracket 66 may include apertures 68 enabling the ladder to be hingedly attached to mounting brackets 70 themselves fixedly attached to the bumper 16 as shown best in FIG. 9. In so doing, the ladder 12 can swing from the deployed position shown in FIG. 9 (and the right hand side of FIG. 1), to a stowed position shown in the left hand side of FIG. 1 wherein the ladder 12 is swung upwardly under the machine 10. Moreover, given the hinged attachment, the ladder 12 can swing forwardly or rearwardly depending on the direction of travel of the work machine 10. In so doing, the ladder 12 can "break away" regardless of direction and due to the mass turning thereof, return to a locked position.

INDUSTRIAL APPLICABILITY

In operation, the teachings of the present disclosure may find applicability in many industries. For example, the rung 34 and ladder 12 disclosed herein could be used in the construction of work machines 10, including but not limited to, off-highway trucks, mining trucks and large excavators. Moreover, they could be used on agricultural equipment such as tractors and combines, commercial vehicles such as on-highway semis and tractor-trailers, delivery trucks and the like, marine ladders, military equipment, aerospace ladders, etc. In each application, the rung and ladders disclosed herein provide robust construction, no welds, reliable assembly, maximized debris fall through, and mass tuning so as to lock the ladder into a given position.

Figure 10:
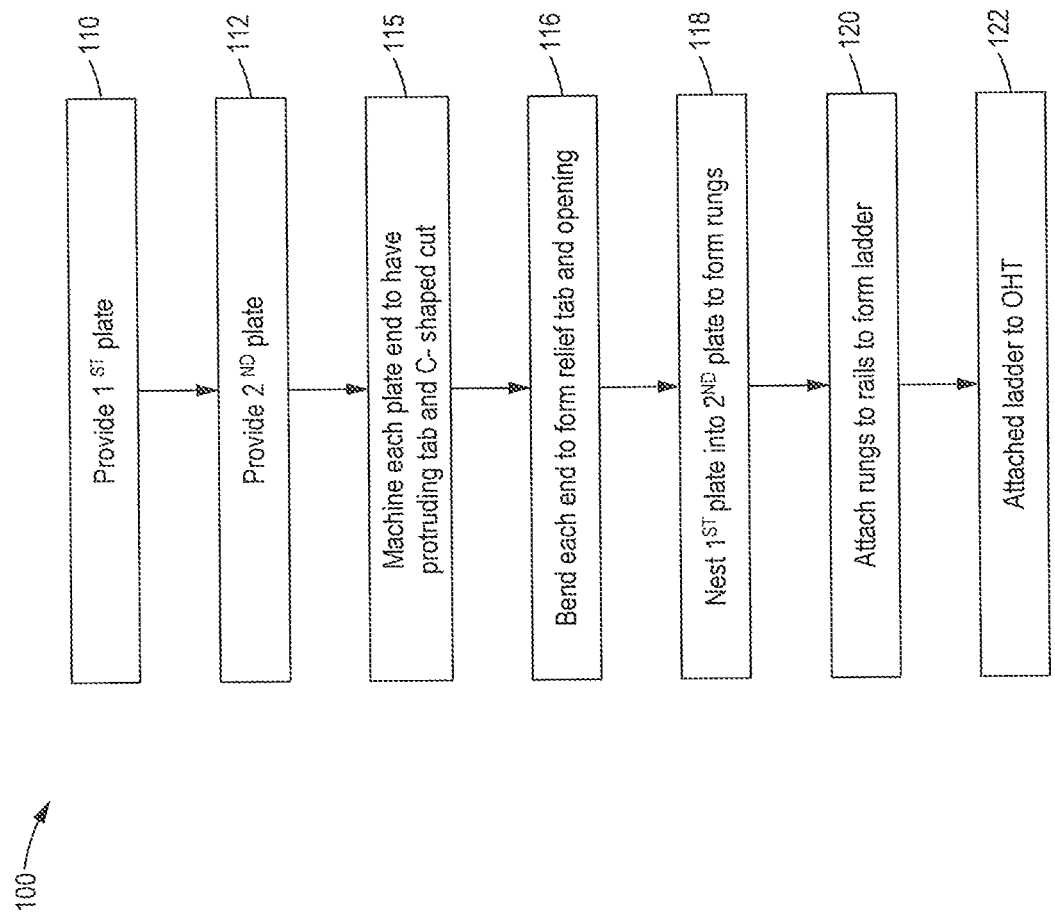
FIG. 10 is a flow chart depicting a sample series of steps, which may be practiced accordingly to the present disclosure.

Referring now to FIG. 10, the method of manufacturing ladder 12 according to the present invention is generally referring to be reference numeral 100. As shown therein, a first step of the method is to provide a first plate 32 as shown by a step 110, and then to provide a second plate 32 as shown by a step 112. Each plate 32 is then machined to include a protruding tab 113 and a cut 114 as shown by step 115. The cut 114 may be "c" or "u" shaped and be formed by any number of known metal working techniques including, but not limited to, grinding, saw blades, abrasion, laser cutting, gas plasma torching, water jets and the like. The plurality of teeth 48 formed in each side 40, 42 can be machined in a manner similar to the cut 114.

In a step 116, each end 36, 38 is then bent to form the relief tab 44 and opening 46. More specifically, the protruding tab 113 is curled away from the plate body 43, such as about a fixed journal or the like. Given the presence of the c-shaped cut 114, this causes the relief tab 44 to pivot away from the plate body 43. Each end 36, 38 thus has a t-shaped confirmation, with the resulting rung half 72 being depicted in FIG. 2.

Once both rung halves 72 are so formed, the first plate 32 is nested with the second plate 32 such that the relief tab 44 of the first end 36 of the first plate 32 is inserted into the opening 46 of the first end 36 of the second plate 32 and the relief tab 44 of the second end 38 of the second plate 32 is inserted through the opening 46 of the second end 36 of the first plate 32 as shown in step 118. The resulting rung 34 is shown in FIG. 5 wherein the relief tabs abut one another in parallel fashion.

Given the identical nature of the rung halves 72, their symmetry allows for only one way of assembly, thereby avoiding improper construction. Once each rung 34 is so assembled, the rungs 34 are bolted between rails 56 as shown in step 120. More specifically, bolts 58 are extended through plates 63, rails 56, and ultimately through bolt holes 50 of each relief tab 44. Nuts 60 are then threadably attached to bolts 50 with washers 62 therebetween. As mentioned above, other fasteners and methods of fastening the rungs 34 to the rails 56 are certainly possible. The resulting ladder 12 is depicted in FIG. 8.

Figure 9:
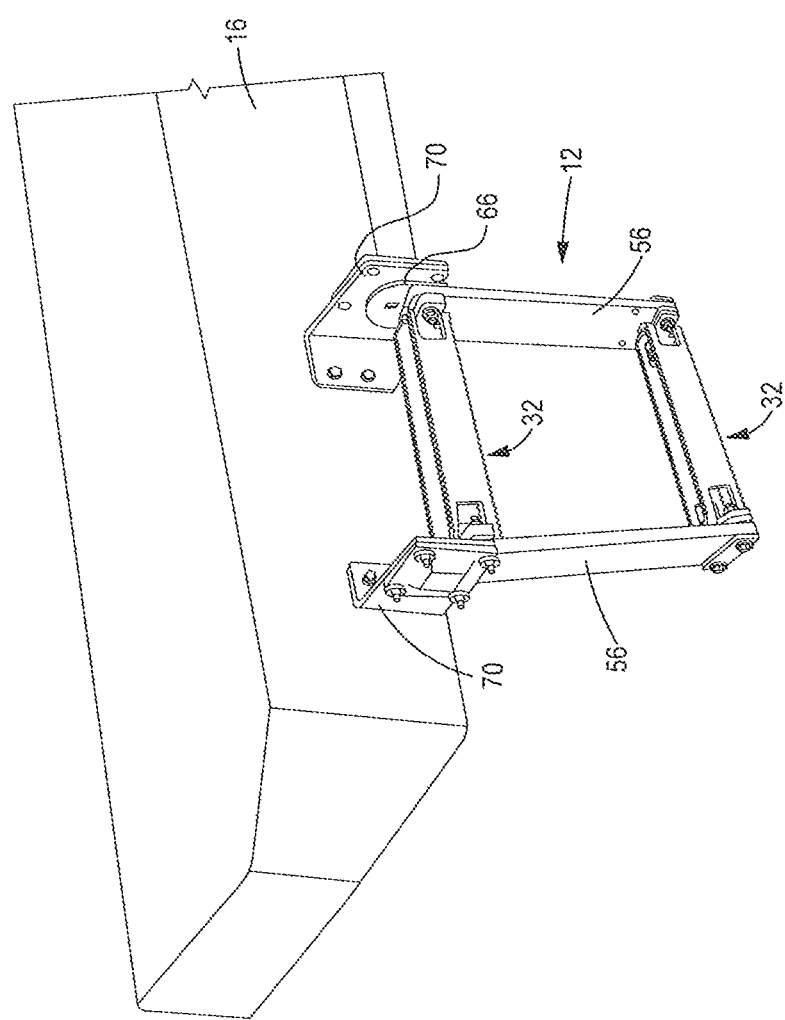
FIG. 9 is a perspective view of the assembled ladder of FIG. 8 attached to a bumper of the truck of FIG. 1.

Finally, the assembled ladder 12 is mounted to the off-highway truck 12 other work machine 10 as shown by step 122 in FIG. 10, and the perspective view of FIG. 9. Moreover, as shown in FIG. 1, more than one ladder 12 can be so attached to the work machine 10.

From the foregoing, it can be seen that the present disclosure sets forth a rung and ladder which are sized and mass tuned so as to be lockable into stowed and use positions. Moreover, it provides for a more robust design with no welds to thus mitigate fatigue and failure. It also facilitates reliable assembly through the use of identical parts which can only be assembled one way, as well as improved debris fall through which complies with current ISO standards.

The invention claimed is:

1. A rung which can be installed in a ladder, comprising:
    a first plate having first and second ends, each of the first and second end having a relief tab and an opening, and
    a second plate, the second plate being identical to the first plate, the first and second plates being nestable such that the relief tab of the first end of the first plate is inserted through the opening of the first end of the second plate and the relief tab of the second end of the second plate is inserted through the opening of the second end of the first plate to form the rung.

2. The rung of claim 1, wherein the first plate is made of a unitary piece of material, and the second plate is made of a unitary piece of material.

3. The rung of claim 1, wherein the rung is formed with no welds.

4. The rung of claim 1, wherein sides of the first and second plates are serrated.

5. The rung of claim 4, wherein when the first plate and the second plate are nested, the rung forms a continuous debris fall-through loop.

6. The rung of claim 5, wherein the serrated side of the first plate is less than 40 mm from the serrated side of the second plate.

7. A ladder for use on a work machine, the ladder comprising;
    first and second rails adapted to movably attach to the work machine; and
    a plurality of rungs extending between the first and second rails, each rung including first and second plates, each plate including first and second ends, each end having a relief tab and an opening, wherein, for each of the plurality of rungs, the first and second plates being nestable such that the relief tab of the first end of the first plate is inserted through the opening of the first end of the second plate and the relief tab of the second end of the second plate is inserted through the opening of the second end of the first plate to form the rung.

8. The ladder of claim 7, wherein the first plate is made of a unitary piece of material, and the second plate is made of a unitary piece of material.

9. The ladder of claim 7, wherein each rung is formed with no welds.

10. The ladder of claim 7, wherein each relief tab includes bolt holes and each rung is attached to the first and second rails with bolts extending through the bolt holes.

11. The ladder of claim 7, wherein sides of the first and second plates are serrated.

12. The ladder of claim 11, wherein each second plate is nested within one of the first plates to form a continuous debris fall-through loop.

13. The ladder of claim 12, wherein the serrated side of each second plate is less than 40 mm from the serrated side of each first plate.

14. The ladder of claim 7, further includes first and second hinges adapted to foldably attach the first and second rails to the work machine and enable the ladder to break away in forward and rearward directions.

15. The ladder of claim 14, when the ladder is foldable from a stowed position to a use position.

16. The ladder of claim 15, wherein the first plate and the second plate are identical.

17. A method of manufacturing a break away ladder for a work machine, the method comprising:
    providing a first plate having first and second ends and first and second sides;
    providing a second plate having first and second ends and first and second sides;
    machining a c-shaped cut in each of the first and second ends;
    bending each of the first and second ends such that each of the first and second ends includes a relief tab and an opening; and
    nesting the first plate into the second plate such that the relief tab of the first end of the first plate is inserted through the opening of the first end of the second plate and the relief tab of the second end of the second plate is inserted through the opening of the second end of the first plate to form a rung.

18. The method of claim 17, further including providing first and second rails and bolting the rung between the first and second rails.

19. The method of claim 18, further including providing first and second hinges and attaching the ladder to the work machines using the first and second hinges.

* * * * *